UNITED STATES PATENT OFFICE.

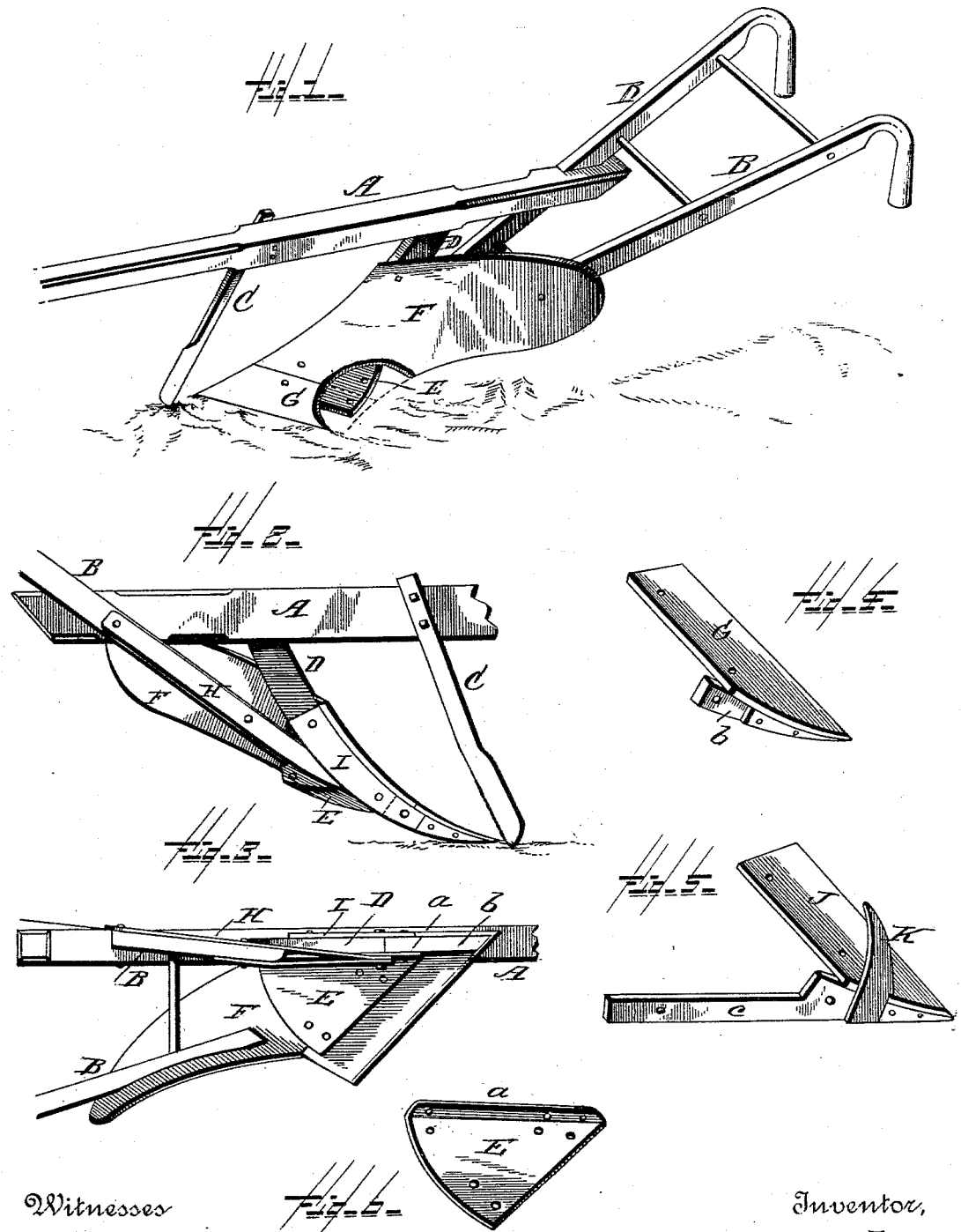

AUGUST HOHLBAUCH, OF CLAY CITY, ILLINOIS.

PLOW.

SPECIFICATION forming part of Letters Patent No. 414,539, dated November 5, 1889.

Application filed May 18, 1889. Serial No. 311,283. (No model.)

*To all whom it may concern:*

Be it known that I, AUGUST HOHLBAUCH, a citizen of the United States, residing at Clay City, in the county of Clay and State of Illinois, have invented certain new and useful Improvements in Plows; and I do hereby declare that the following is a full, clear, and exact description of the same, reference being had to the annexed drawings, making a part of this specification, and to the letters and figures of reference marked thereon.

Figure 1 of the drawings is a perspective view of my improved plow; Fig. 2, a side elevation thereof; Fig. 3, an under side plan view; Fig. 4, a detail view in perspective of the plow-point; Fig. 5, a similar view of the cutter attachment and Fig. 6 a detail view in perspective of the brace-plate.

The present invention has for its object to provide a plow that will be simple in construction and effective in its purpose; and it consists in the details of construction, substantially as shown in the drawings and hereinafter described and claimed.

In the accompanying drawings, A represents the plow-beam, and B the handles, of the usual construction, said beam having connected thereto the cutter C and standard D, preferably of hardened steel. A brace-plate of malleable iron, as shown at E, is bolted to the mold-board F upon the lower side thereof and upon the inner side of the standard. This plate is formed with a flange $a$, extending at right angles to the plane of the plate to form a support for the standard and extends some distance below the lower end of the mold-board to form a rest for the share G, to which plate the share is bolted.

An iron brace H is fastened to one of the handles B and to the plate E, so that the parts will be firmly braced and held together against any heavy jar upon the point of the plow. The brace H, as will be seen by reference to Fig. 3, is bifurcated, so as to embrace both sides of the lower end of one of the handles, as above described, thus providing greater rigidity and firmness at the point of connection between the handle and brace.

The share and plow-point, as shown more clearly in Fig. 4, is formed with a flange $b$ for the brace I, this brace being bolted to the standard D and extends over and upon the flange $b$ of the share G. This share is detachably connected to the landside of the plow, or, rather, the mold-board, so that it can be removed and the share J connected in its place, and is provided with a steel cutter K and the bar $c$, which takes the place of the arm $d$ of the bifurcated brace H when attached to the plow, thus providing an attachment that will do excellent work in sod, stubble, or fallow ground.

Having now fully described my invention, what I claim as new, and desire to secure by Letters Patent, is—

The combination, with the standard and mold-board, of the brace bolted to the standard, the detachable and interchangeable share J, provided with cutter K, and the detachable landside-bar $c$, the whole forming a plow capable of being used with or without the landside and cutter, substantially as and for the purpose specified.

In testimony that I claim the above I have hereunto subscribed my name in the presence of two witnesses.

AUGUST HOHLBAUCH.

Witnesses:
GEORGE RUBINS,
H. L. DAGGITT.